(12) United States Patent
Diekhans et al.

(10) Patent No.: US 8,428,830 B2
(45) Date of Patent: Apr. 23, 2013

(54) AGRICULTURAL WORKING VEHICLE

(75) Inventors: Norbert Diekhans, Guetersloh (DE);
Lars Peter Meyer Zu Helligen, Spenge (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 1247 days.

(21) Appl. No.: 12/236,195

(22) Filed: Sep. 23, 2008

(65) Prior Publication Data

US 2009/0088932 A1    Apr. 2, 2009

(30) Foreign Application Priority Data

Sep. 27, 2007 (DE) .................. 10 2007 046 678

(51) Int. Cl.
  *G06F 7/70* (2006.01)
  *G06F 19/00* (2011.01)
  *G06G 7/00* (2006.01)
  *G06G 7/76* (2006.01)
(52) U.S. Cl.
  USPC ......................................................... 701/50
(58) Field of Classification Search ........ 701/50
  See application file for complete search history.

(56) References Cited

U.S. PATENT DOCUMENTS

| | | | | |
|---|---|---|---|---|
| 5,712,782 A * | 1/1998 | Weigelt et al. | ............ | 701/50 |
| 5,995,895 A * | 11/1999 | Watt et al. | ............ | 701/50 |
| 6,205,384 B1 * | 3/2001 | Diekhans | ............ | 701/50 |
| 6,726,559 B2 * | 4/2004 | Bischoff | ............ | 460/1 |
| 6,863,604 B2 | 3/2005 | Behnke | | |
| 7,266,415 B2 * | 9/2007 | Fitzner | ............ | 700/17 |
| 7,337,023 B2 * | 2/2008 | Diekhans | ............ | 700/52 |
| 7,362,233 B2 * | 4/2008 | Behnke et al. | ............ | 340/684 |
| 7,415,340 B2 * | 8/2008 | Fitzner | ............ | 701/50 |
| 7,540,129 B2 * | 6/2009 | Kormann | ............ | 56/10.2 E |
| 7,630,809 B2 * | 12/2009 | Behnke et al. | ............ | 701/50 |

FOREIGN PATENT DOCUMENTS

EP    1 297 733    4/2003

* cited by examiner

*Primary Examiner* — Khoi Tran
*Assistant Examiner* — Nicholas Kiswanto
(74) *Attorney, Agent, or Firm* — Michael J. Striker

(57) ABSTRACT

An agricultural working vehicle has a plurality of working assemblies, at least one control unit for influencing the setting parameters of the working assemblies, a memory unit, and at least one display unit, and it is configured such that even an untrained operator may optimize the setting parameters of the working assemblies in a rapid, reliable manner. An expected change in the function and/or the working result of individual working assemblies or a plurality of working assemblies is depicted in the display unit in a manner that depends on how an operator influences individual setting parameters of the working assemblies.

17 Claims, 5 Drawing Sheets

AGRICULTURAL WORKING VEHICLE

CROSS-REFERENCE TO RELATED APPLICATION

The invention described and claimed hereinbelow is also described in German Patent Applications DE 10 2007 046 678.3 filed on Sep. 27, 2007. This German Patent Application, whose subject matter is incorporated here by reference, provides the basis for a claim of priority of invention under 35 U.S.C. 119(a)-(d).

BACKGROUND OF THE INVENTION

The present invention relates to an agricultural working vehicle.

Agricultural working vehicles, e.g., tractors, combine harvesters, forage harvesters, etc., typically include a large number of working assemblies, the setting parameters of which may be influenced by a control unit. With modern agricultural working machines, the function and/or working result of individual working assemblies or a plurality of working assemblies depends essentially on the correct setting parameters of the individual working assemblies and/or their interplay. The correct selection of the setting parameters is therefore of decisive significance to the proper, efficient use of the agricultural working vehicle. Since there are highly complex interrelationships between the individual working assemblies and their influence on the working result, however, the setting parameters often have a nonlinear influence on the working result, and since the setting parameters that are required to attain a certain function or a certain working result are subject to strong hysteresis, it is difficult for untrained operators of the working vehicle in particular to select the optimal setting parameters for the working assemblies.

Numerous options that are designed to support the operator in his selection of the optimal setting parameters are known from the related art. For example, publication EP 1 297 733 A1 makes known a method for determining harvesting machine settings, with which the harvesting machine is initially acted upon during operation with a nearly consistent quantity of crop material, the working result is recorded after a certain time delay, and it is stored together with the associated setting parameters of the working assemblies. The operator may now change a setting parameter of a working assembly, the harvesting machine restarts operation, and the process—described above—of recording the working results and then storing them together with the associated setting parameters is repeated. The two recorded working results are now compared with each other and the setting parameters of the better working result are used to set up the working assemblies.

The disadvantage of the known method is that, due to the time delay between the particular start of the harvesting operation and the sensor-supported registration of the working result that is attained, a great deal of time is required to optimize the setting parameters. It is also disadvantageous that the operator must repeatedly try to attain a nearly constant crop material throughput rate in order to ensure that the working results obtained with different setting parameters are comparable. This requires a great deal of skill on the part of the operator and also takes a great deal of time.

SUMMARY OF THE INVENTION

The object of the present invention is to avoid the disadvantages of the related art described above, and, in particular, to provide an agricultural working vehicle such that even an untrained operator may optimize the setting parameters of the working assemblies rapidly and reliably.

This object is attained according to the present invention in that an expected change in the function and/or the working result of individual working assemblies or a plurality of working assemblies is depicted in the display unit in a manner that depends on how an operator influences individual setting parameters of the working assemblies.

The depiction of the expected change in the function and/or the working result of individual working assemblies or a plurality of working assemblies therefore also enables an inexperienced operator to directly and rapidly assess the effects of the change he made to the setting parameters of the working assemblies without these effects having been noticeable. What is basically involved here is not changes to the function and/or the working result that are exactly definable using numbers, but rather a visualization of the trend of the expected effects of the operator's actions. This direct and immediate depiction of the expected effects then prompts the operator to immediately influence the setting parameters—when the expected effects are negative—such that he may immediately attain a positive function and/or a positive working result of individual working assemblies or a plurality of working assemblies.

Advantageously, the expected change is displayed in evaluated form, so that the operator is shown via the display unit whether the influence he made on the setting parameters will have a positive, neutral, or negative effect on the function and/or the working result of individual working assemblies or a plurality of working assemblies.

Advantageously, a large number of setting parameters is stored in a recallable manner in the memory unit along with their influence on the function and/or the working result of individual working assemblies or a plurality of working assemblies, which are compared with the current setting parameters influenced by the operator, in order to depict an expected change in the function and/or working result in the display unit. The memory unit therefore contains a comprehensive database, which serves to depict the effect to be expected based on a large number of possible selections of the setting parameters carried out by the operator.

In an advantageous refinement of the present invention, in order to continually increase the database, and, therefore, to improve the quality of the statement regarding the expected change to the function and/or the working result, setting parameters and/or functions and/or working results that deviate from the setting parameters stored in the memory unit along with their influence on the function and/or the working result of individual working assemblies or a plurality of working assemblies are stored in the memory unit in a recallable manner.

The expected changes are communicated in a visually rapid and simple manner to an untrained operator of the agricultural working vehicle in particular by depicting the expected change in the function and/or the working result of individual working assemblies or a plurality of working assemblies in the display unit in the form of various pictograms. It is particularly advantageous when the shape and/or color and/or size of the pictograms depicted in the display unit differ in a manner that depends on the expected change in the function and/or the working result of individual working assemblies or a plurality of working assemblies. Possible pictograms depend on the associated effect and include a large number of known forms, such as exclamation points, arrows, smiley faces, frowning faces, hand figures with the thumb pointing up or down, etc. It is also feasible to display the pictograms in color depending on the effect to be communicated, e.g., in red if the effects are expected to be negative, and green if the effects are expected to be positive.

In an advantageous refinement, in order to avoid overwhelming the operator with information and to be able to show him the actual effects of his influence on the setting parameters in the display unit as quickly as possible, an expected change to the function and/or the working result of individual working assemblies or a plurality of working assemblies is depicted in the display unit only for a certain period of time.

To make it even easier for an untrained operator, in particular, to identify the optimal setting parameters, an advantageous refinement of the present invention is designed such that a large number of setting parameters is stored in a recallable manner in the memory unit along with their influence on the function and/or the working result of individual working assemblies or a plurality of working assemblies, which are compared with the current setting parameters influenced by the operator, in order to depict an expected change in the function and/or working result in the display unit, and, if the change in the function and/or working result is expected to be negative, the operator is also shown setting parameters that are stored in the memory unit that would bring about a positive change in the function and/or working result. The operator is therefore shown not only the trend of the expected effects, but he is also shown an option for adjusting the setting parameters that would result in an optimal function and/or an optimal working result.

Highly complex agricultural working machines, in particular, such as combine harvesters, include a large number of adjustable working assemblies, to which a large number of setting parameters may be assigned. In an advantageous refinement, in order to avoid having to display the expected changes for each of the many working assemblies—since the function and/or the working result of individual working assemblies are/is negligible to the overall function and/or the overall working result of the agricultural working vehicle—the operator may select individual or a plurality of functions and/or working results from a plurality of functions and/or working results of individual working assemblies or a plurality of working assemblies, the expected change to which is depicted in the display unit. The operator may therefore concentrate on the important functions and/or working results. The selection of the expected changes to be displayed may depend, e.g., on the current work assignment for the agricultural working machine. When a combine harvester is scheduled to harvest seed corn, for example, it is particularly important for the harvested corn to have a high level of purity and very little damaged grain. With a work assignment of this type, only those expected changes to the function and/or the work result are now displayed that have an influence on the stated objective and/or the stated work assignment. The selection may also be made externally of the harvesting machine, e.g., at a central farm-based computer, and then transferred to the agricultural harvesting machine via suitable transmission paths.

Advantageously, the operator may evaluate the expected changes that were selected to be displayed in a weighted manner, thereby ensuring that he is shown those expected changes that have the greatest influence on the particular functionality and/or working result he is interested in such that they are emphasized or are different from the expected changes that have less influence. It is also feasible for certain setting parameters that affect the safety of the agricultural harvesting machine to be stored in the memory unit along with their expected changes, and that they always be shown to the operator regardless of what selection is made when the operator influences the working assemblies using the setting parameters.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
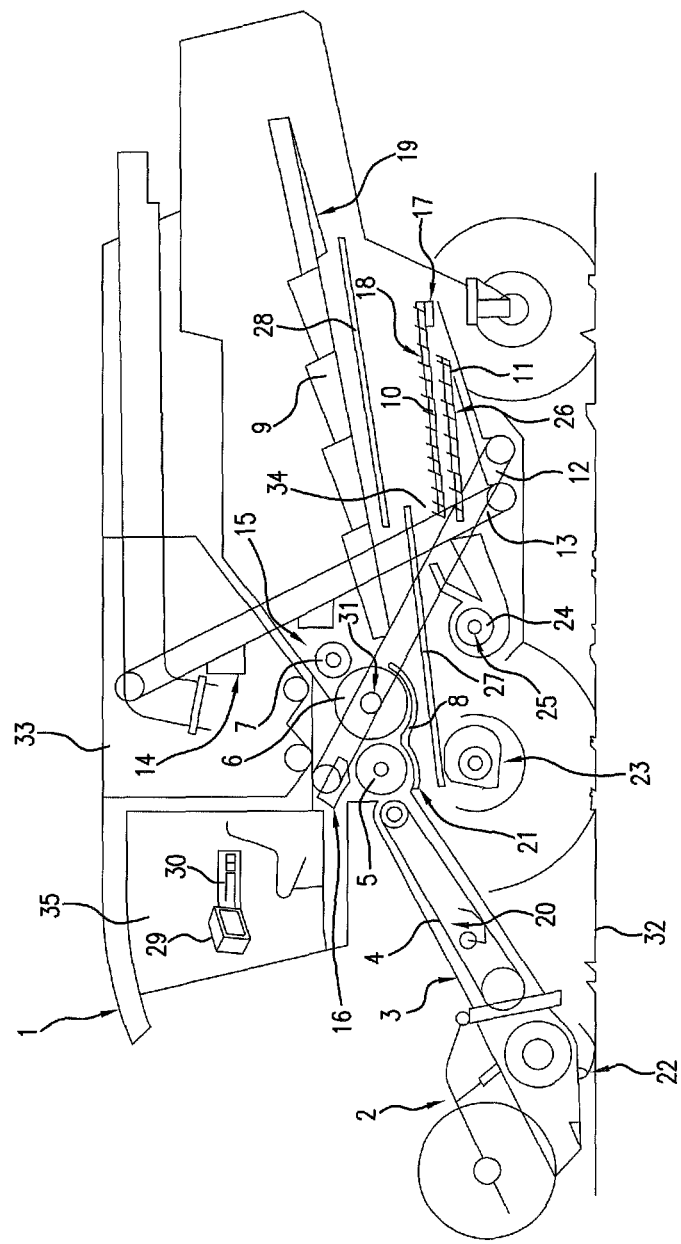
FIG. 1 shows a schematic side view of a combine harvester in accordance with the present invention.

A schematicized side view of an agricultural working vehicle designed as a combine harvester 1 is shown in FIG. 1, as an example. The object of a combine harvester 1 is to pick up the crop material growing on stalks from a field 32 and separate it from the straw and other admixtures. A grain cutting device 2, which is used to pick up the crop material, is shown in FIG. 1 as an example. It cuts the crop stalks with the crop material in the ears out of field 32 and combines them across the width of feeder 3, which performs the intake function. Located in feeder 3 are rotating feed chains 4 with transverse segments that feed the crop material to downstream threshing units 5, 6. The crop material is removed by preacceleration cylinder 5 at the end of feed rake 3 and is accelerated around the circumference of preacceleration cylinder 5 between preacceleration cylinder 5 and concave 8. The accelerated crop material is then transferred to cylinder 6. The crop material is separated from the ears and straw via the striking and rubbing effect of preacceleration cylinder 5 and cylinder 6, and via the centrifugal force acting on the crop material.

The crop material then travels through concave 8, which allows the crop material to pass, and reaches grain pan 27. The straw output by cylinder 6 is redirected by impeller 7 to several shakers 9 located next to each other across the working width. The oscillating motion of shakers 9 and their stepped design cause the straw to be conveyed to the back end of the combine harvester, thereby removing the crop material remaining in the straw. This remaining quantity is also transferred via return pan 28 and an oscillating motion thereof to grain pan 27. The crop material with the remaining admixtures, e.g., straw pieces, chaff, and ear pieces, located on grain pan 27 is separated via an oscillating motion of grain pan 27 and its stepped design, and is conveyed to downstream cleaning units 10, 11, 24. The transfer takes place via a straw walker step 34 ventilated by cleaning fan 24 to upper sieve 10.

Upper sieve 10 and lower sieve 11 located below it are usually chaffers with separately-adjustable opening widths; upper sieve 10 in the rear region may be adjusted with a opening width that differs from the remaining opening widths of upper sieve 10. A flow of air created by cleaning fan 24 passes through upper sieve 10 and lower sieve 11. The oscillating motion of sieves 10, 11 and the air flow cause the crop material and its admixtures to be directed toward the back end of the harvesting machine. By way of straw walker step 34, large and lightweight admixtures are captured by the air flow before they reach upper sieve 10 and are ejected out of combine harvester 1. Smaller and heavier crop components travel from grain pan 27 via straw walker step 34 to upper sieve 10.

Depending on the setting of the upper sieve width, the individual crop grains and further components of the crop material fall through it, thereby reaching lower sieve 11. Straw and non-threshed-out ears are moved past the front sieve area and, in the rear region of upper sieve 10, fall through upper sieve 10 directly into the "tailings". Lower sieve 11 typically has a finer plate structure than upper sieve 10, and is normally set with a smaller opening width than upper sieve 10. Larger and lighterweight crop components, such as crop grains with husks, ear parts, or stalk parts—provided they have traveled through upper sieve 10 and reached lower sieve 11—are transferred via the oscillating motion and air flow into the tailings. The cleaned crop material falls directly through lower sieve 11 and is conveyed to grain tank 33 using a feed auger and grain elevator 13. The crop material that reaches the tailings is returned to the threshing process via a feed auger and tailings elevator 12 above preacceleration cylinder 5.

Combine harvester 1 is equipped with a driver's cab 35, in which a display unit 29 and a control unit 30 with an integrated memory unit are located. Devices for specifying the driving direction and ground speed of combine harvester 1 are also provided, although they are not shown and they are known to one skilled in the art. Display unit 29 and control unit 30 are connected with individual sensors and actuators located on combine harvester 1 at various points. They allow the operator of combine harvester 1 to adjust and monitor the setting parameters of the individual working assemblies and, therefore, the functionality of combine harvester 1. In FIG. 1, arrows point to the different points in combine harvester 1 where a sensor is located for determining process and setting parameters. The actuators used to adjust combine harvester 1 are adequately known to one skilled in the technical art; the particular element will therefore not be depicted in FIG. 1.

A ground speed-measuring device 23 that detects the particular ground speed is located on the drive axle of combine harvester 1. A cutting-height measuring device 22 is assigned to header 2. This device 22 serves to determine the actual distance between header 2 and field surface 32. The sensed value may be displayed to the operator using display unit 29, and may also be used as the actual value for the automatic regulation of cutting height.

A crop-quantity measuring device 20 is installed in feed rake 3 to detect the harvested quantity. It determines the deflection of a feed chain 4, which is a function of the crop-material quantity.

A further sensor system is located on concave 8. This concave-width measuring device 21 is provided singly or in plurality, and determines the distance between preacceleration cylinder 5 and concave 8 and/or cylinder 5 and concave 8 at one or more points.

Preacceleration cylinder 5, cylinder 6, and impeller 7 are usually driven by a common drive, it being possible to vary the speeds of cylinders 5, 6, 7 using a servo drive. A cylinder-speed measuring device 31 for detecting at least one of the cylinder speeds is assigned to these cylinders 5, 6, 7.

To produce different air flows through the cleaning device, the drive of cleaning fan 24 has a variable-speed design. The actual speed of cleaning fan 24 is detected using a cleaning-fan measuring device 25.

Additional sensors may be assigned to the cleaning device. In this manner, the particular sieve opening width may also be detected using an upper-sieve width measuring device 18 and a lower-sieve width measuring device 26. Measuring devices 18, 26 may be part of the particular not-shown adjustment device, or they may be separate therefrom, and they may be located on sieve 10, 11. An upper-sieve loss measuring device 17 is located on the back end of upper sieve 10. This device is used to detect the portion of crop grains that leave combine harvester 1 via the cleaning device and that are considered losses. Sensors of this type are known to one skilled in the art and extend across part or all of the working width of the cleaning device. They are normally designed as a baffle plate or tube and evaluate the oscillations that are produced by the impact of crop grains on the plate or tube.

This sensor technology may also be used and located at any other point in a combine harvester 1. This sensor technology allows flows of crop grains to be detected and makes it possible to obtain a determination—that is comparative and relative, at the least—of the quantities of grain present at a particular site. This sensor technology is also used in shakers 9 to detect the separation. To obtain a determination of the amount of crop grains remaining in the straw, a shaker-loss sensor 19 is attached at least to the back end of a shaker 9. This sensor 19 detects the portion of crop grains separated at the end of shaker 9. To also evaluate the quantity of crop grains in the tailings, a baffle plate sensor system of this type may also be located at the end of lower sieve 11 or at the point at which the tailings are returned to the threshing process.

To evaluate the crop components located in the tailings, a tailings-measuring device 16 is located on the upper end of tailing elevator 12. It is used to determine the tailings volume, the portion of grain, and the portion of damaged grain. Optical light barriers, optical sensors, or transillumination sensors (NIR sensors) are known for use for this purpose.

Grain elevator 13 is equipped with further sensors 14, 15, which serve to determine the quantity conveyed through a yield-measuring system 14 and to determine the specific weight of the crop material using a calibration scale 15.

As indicated above in the description of the functionality of combine harvester 1, the operator of combine harvester 1 has a large number of options for influencing setting parameters of the individual working assemblies.

A "working assembly" in the sense of the present invention refers to all components and/or control elements of an agricultural working vehicle that perform a certain function to attain a working result of the working machine. Using the aforementioned example of combine harvester 1 as an example, these working assemblies may be, e.g., grain-cutting device 2, feed rake 3, feed chains 4, pre-acceleration cylinder 5, cylinder 6, impeller 7, concave 8, shaker 9, upper sieve 10, lower sieve 11, tailings elevator 12, grain elevator 13, cleaning fan 24, grain pan 27, and/or return pan 28. A group of interacting individual working assemblies is referred to as a working assembly in the context of the present invention. This may be, e.g., the cleaning device of combine harvester 1 that is composed of upper sieve 10, lower sieve 11, and cleaning fan 24. The different sensors and measuring systems located in the working machine are also considered to be working assemblies in the context of the present invention, i.e., yield-measuring system 14, calibration scale 15, tailings-measuring device 16, upper-sieve loss measuring device 17, upper-sieve width measuring device 18, shaker-loss sensor 19, crop-quantity measuring device 20, concave-width measuring device 21, cutting-height measuring device 22, ground-speed measuring device 23, cleaning fan-measuring device 25, lower-sieve width measuring device 26, and/or cylinder-speed measuring device 31.

"Setting parameters" in the context of the present invention refer to any methods used to influence the working assemblies of the agricultural working machine. A few possible examples include specifying a certain rotational speed, and/or a certain frequency, and/or a certain speed, and/or a certain distance, and/or a certain pressure, and/or a certain crop material throughput quantity of a working assembly. A setting parameter may also include, e.g., adjusting the sensors and measuring devices located in the agricultural working machine. This includes, e.g., specifying a certain sensitivity of a sensor or a certain time sequence in which a measurement procedure takes place, or a specified correction value to influence the results measured by a sensor or a measuring device. This list is merely an example and should not be considered final. An "operator" in the sense of the present invention is the individual or a plurality of individuals who may influence the setting parameters of the working assemblies of an agricultural working vehicle, and to whom an expected change to a function and/or the working result of individual working assemblies or a plurality of working assemblies are/is displayed. This may be the driver of the agricultural working vehicle himself and/or a driver of another agricultural working vehicle who is authorized to access—via suitable transmission means—the control unit of the working vehicle to be adjusted, and/or a further group of individuals, e.g., a land manager working on his farm-based computer, who is authorized to access—via suitable transmission means—the control unit of the working vehicle to be adjusted. This list of possible operators is only an example and should not be considered final.

To explain the invention in greater detail, a subregion of the working assemblies and the functions of combine harvester 1 shown in FIG. 1 will be discussed below, as an example.

The object of the work assignment could be, e.g., to harvest a field of grain, in the case of which the harvested crop grain shall be used as seeds for the next planting season. Crop grain of this type that is used as seed must be extremely clean, i.e., the portion of other crop material components—such as crop grains with husks, ear pieces, or small particles of straw—in grain tank 33 should be minimal. It is also important that the portion of damaged grain, i.e., crop grain that becomes damaged during the harvesting, threshing, and/or cleaning process, be very small, since it is not possible to further process grains of this type as seed. To keep the costs for harvesting seed of this type within limits, however, it is also important that field 32 be harvested in the shortest amount of time possible, and that the quantity lost—i.e., the crop grains that were not threshed out or that were ejected from the cleaning device—be minimized. To reach this goal, a large number of working assemblies must be set up with setting parameters that are tailored to the particular harvest conditions. This task is often overwhelming to untrained operators in particular.

When, e.g., the operator determines or reads in the display that the quantity of tailings is very high, he will reduce, e.g., the concave width, that is, the distance between pre-acceleration cylinder 5 and concave 8, and/or the distance between cylinder 6 and concave 8, in order to obtain a more aggressive threshing process and, therefore, to increase the quantity of threshed-out crop grains, which, in turn, lowers the quantity of tailings. If the concave width is set too small, this necessarily results to an increase in the quantity of damaged grain, due to the aggressive threshing process. Since it is not possible to detect this directly using sensors and/or via the operator, and, in particular, a compromise between the purity of crop grains, the quantity of tailings, and the quantity of damaged grain must be found that is optimal depending on the target requirements of the particular work assignment, control unit 30 immediately checks to determine whether the concave width setting and the associated setting parameters of the further working assemblies and the sensor values of the individual sensors of combine harvester 1 are stored in the control unit. If they are, the trend of the expected effect of the setting that was entered is depicted in display unit 29.

As an alternative, a related algorithm is stored in the control unit that calculates the trend of the expected effect of the setting that was entered and depicts it in display unit 29. This displayed trend could be, e.g., a symbol for an expected very high quantity of damaged grain. The operator would then intuitively know that he had set the concave width too low. At this point in time, however, no crop material or only a very small quantity of crop material has passed through the threshing region. If the operator then increases the concave width immediately, the negative effect on the quantity of damaged grain present in the crop material is minimal. When the operator then increases the concave width, control unit 30 once again immediately starts to check the data stored in the control unit and/or starts the calculation using the stored algorithm so that, if the concave width is too great, a symbol is immediately displayed in control unit 29 that indicates that the quantity of tailings is tending to increase.

The operator now has the option of changing the concave width in small increments until an optimal compromise is found between the quantity of damaged grain, the cleanliness of the crop grains, and the quantity of tailings. As an alternative, it is feasible for display unit 29 to show the trend of the expected effect of the adjustment made by the operator, and for control unit 30 to display suggestions—based on stored data records and/or the result of a calculation—for a more optimal setting, and to display them in display unit 29. These suggestions may be specific numerical values for the setting parameters and quantitative statements, e.g., "Reduce concave width", and/or related symbols.

When, as an alternative, and for example, the operator determines or reads in the display that the cleanliness of the crop grains conveyed into grain tank 33 is very poor and therefore does not meet the target requirements of the work assignment, he will, e.g., reduce the sieve opening width of upper sieve 10 and/or lower sieve 11, thereby enabling a smaller quantity of crop material components to pass through upper sieve 10 and/or lower sieve 11 and into grain elevator 13 and, therefore grain tank 33. If the sieve opening width of upper sieve 10 and/or lower sieve 11 is set too small, however, this necessarily results in an increase in the quantity lost, i.e., the crop grains ejected from the cleaning device, since ears that extend beyond the sieve opening width and contain grains that have not been threshed out and/or larger crop grains are unable to pass through the lamella of sieve 10, 11.

Since it is not possible to detect this directly using sensors and/or via the operator, and, in particular, a compromise between the purity of crop grains, the quantity of tailings, and the quantity of damaged grain must be found that is optimal depending on the target requirements of the particular work assignment, control unit 30 immediately checks to determine whether the concave width setting of the sieve lamella of upper sieve 10 and/or lower sieve 11, and the associated setting parameters of the further working assemblies and the sensor values of the individual sensors of combine harvester 1 are stored in the control unit. If they are, the trend of the expected effect of the setting that was entered is depicted in display unit 29. As an alternative, a related algorithm is stored in the control unit that calculates the trend of the expected effect of the setting that was entered and depicts it in display unit 29. This displayed trend could be, e.g., a symbol for an expected very high quantity of loss due to cleaning. The operator would then intuitively know that he had set the sieve opening width too low. At this point in time, however, no crop material or only a very small quantity of crop material has passed through the cleaning device. If the operator then increases the sieve opening width immediately, the negative effect on the quantity lost to cleaning is minimal.

When the operator then increases the sieve opening width, control unit 30 immediately starts to check the data stored in the control unit and/or starts the calculation using the stored algorithm so that, if the sieve opening width is too great, a symbol is immediately displayed in control unit 29 that indicates that the cleanliness of the crop material tending to decrease. The operator now has the option of changing the sieve opening width in small increments until an optimal compromise is found between the quantity lost due to cleaning and the cleanliness of the crop material. As an alternative, it is feasible for display unit 29 to show the trend of the expected effect of the adjustment made by the operator, and for control unit 30 to display suggestions—based on stored data records and/or the result of a calculation—for a more optimal setting, and to display them in display unit 29. These suggestions may be specific numerical values for the setting parameters and quantitative statements, e.g., "Reduce sieve opening width", and/or related symbols.

When, as an alternative, and for example, the operator determines or reads in the display that the cleanliness of the crop grains conveyed into grain tank 33 is very poor and therefore does not meet the target requirements of the work assignment, he will, e.g., increase the speed of cleaning fan 24, so that a larger quantity of crop material components is ejected out of the cleaning device via the air flow. If the speed of cleaning fan 24 is set too high, however, this necessarily results in an increase in the quantity lost, i.e., the quantity of crop grains ejected from the cleaning device, since small and lightweight crop grains are also carried by the air flow and are blown out of combine harvester 1.

Since it is not possible to detect this directly using sensors and/or via the operator, and, in particular, a compromise between the purity of crop material and the quantity lost due to cleaning must be found that is optimal depending on the target requirements of the particular work assignment, control unit 30 immediately checks to determine whether the setting for the fan speed of cleaning fan 24 and the associated setting parameters of the further working assemblies and the sensor values of the individual sensors of combine harvester 1 are stored in the control unit. If they are, the trend of the expected effect of the setting that was entered is depicted in display unit 29. As an alternative, a related algorithm is stored in the control unit that calculates the trend of the expected effect of the setting that was entered and depicts it in display unit 29.

This displayed trend could be, e.g., a symbol for an expected very high quantity of loss due to cleaning. The operator would then intuitively know that he had set the fan speed too high. At this point in time, however, no crop material or only a very small quantity of crop material has passed through the cleaning device. If the operator reduces the fan speed immediately, the negative effect on the quantity lost to cleaning is minimal. When the operator then reduces the fan speed, control unit 30 immediately starts to check the data stored in the control unit and/or starts the calculation using the stored algorithm so that, if the fan speed is too low, a symbol is immediately displayed in control unit 29 that indicates that the cleanliness of the crop material is tending to decrease. The operator now has the option of changing the fan speed in small increments until an optimal compromise is found between the quantity lost due to cleaning and the cleanliness of the crop material. As an alternative, it is feasible for display unit 29 to show the trend of the expected effect of the adjustment made by the operator, and for control unit 30 to display suggestions—based on stored data records and/or the result of a calculation—for a more optimal setting, and to display them in display unit 29. These suggestions may be specific numerical values for the setting parameters and quantitative statements, e.g., "Reduce fan speed", and/or related symbols.

A further inventive sequence for the adjustment process is based on adjusting an automatic steering system of combine harvester 1. This automatic steering system is GPS-based, for example, and therefore automatically generates guide lines for combine harvester 1 to follow. When generating guide lines, the steering system considers, e.g., the working width of grain-cutting device 2, in order to make optimal use of it. It has been proven in practice that it is not always appropriate to use the full working width of grain-cutting device 2, because ears pointing outwardly on the edge of the field would not be harvested. To solve this problem, a certain transverse deviation, i.e., a displacement of the guide line to follow relative to the calculated guide line, must be set in the steering system. This may take place using an averaging device.

When setting the transverse deviation, a number of basic conditions must be taken into account, e.g., the inclination of the field, the signal drift of position data, incorrectly calibrated GPS receivers, and/or an incorrectly set working width of grain-cutting device 2. This is a difficult task for an untrained operator in particular. When the operator actuates the averaging device, an algorithm stored in control unit 30 calculates the effects of the transverse deviation relative to the guide line generated by the steering system, and the guide line generated by the steering system and the guide line influenced by the averaging device are displayed in display unit 29, thereby enabling the operator to intuitively recognize what effects the averaging will have on the tracking of the automatic steering system of the combine harvester.

To make the display clearer, the guide lines may be shown in the display unit in different colors. A display—of the expected effect—of this type in display unit 29 may take place without a positive or negative evaluation also being displayed. Instead, the operator may be provided only with information about what the results of his setting will be. The operator may then draw his own conclusions. The four sequences for the adjustment process described above using a working vehicle designed as a combine harvester as an example merely represent countless adjustment process sequences that may be carried out on agricultural working vehicles, and they do not limit the present invention to the sequences described herein.

Figure 2:
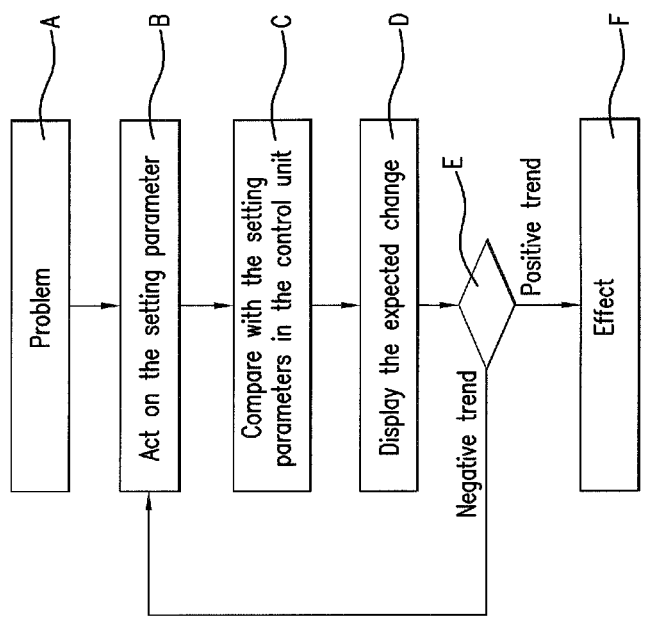
FIG. 2 shows a flow chart of the process in accordance with the present invention.

A flow chart of the inventive process is shown in FIG. 2. At the start of the process, the operator identifies a problem A, e.g., "Quantity lost is too high", so he influences the related setting parameters B. According to the example selected, the task here would be to reduce the concave width. In the subsequent process field C, the control unit compares the setting parameters that were adjusted—the concave width setting in this case—with the setting parameters stored in the memory unit. In addition to the comparison of the setting parameters, the currently detected sensor values are compared with the sensor values stored with the stored setting parameters, for instance. In the next process step D, at least one trend of the expected change to the function and/or the working result resulting from the adjustment that was made is displayed.

As an alternative, it is feasible for an algorithm that calculates the trend of the expected change to be stored in the control unit. According to the example, it was shown, e.g., that the quantity of damaged grain will increase to a disproportionately great extent, which is considered to be a negative trend. If a negative trend is displayed, the operator will intuitively decide in process step E that he must change the adjustment once more, and therefore returns to process field B. The operator continues to proceed through steps B>C>D>E until a positive trend is displayed in step D, which ultimately results in his retaining the setting parameters that have the effect F on the function and/or working result of the working assemblies.

Two pictograms 36 that may be displayed in display unit 29 in the example described above are shown as examples in FIGS. 3a and 3b. When, e.g., the operator sets the fan speed of cleaning fan 24 too high in order to attain a high level of cleanliness of crop material, this would result in more crop grains being blown by the fan air flow past upper sieve 11 or lower sieve 12 and out of combine harvester 1. This would be sensed by upper and lower-sieve loss measuring devices 12, 26. A certain amount of time passes between the instant when the speed is adjusted and when this is sensed by the measuring devices. During this time, a certain quantity of crop material passes through the cleaning device. To prevent the quantity lost from increasing during this period, pictogram 36 shown in FIG. 3a is shown to the user in display unit 29 immediately after he increases the fan speed, since control unit 30 knows—based on the data stored in the memory unit—that higher losses are to be expected.

Figure 3B:
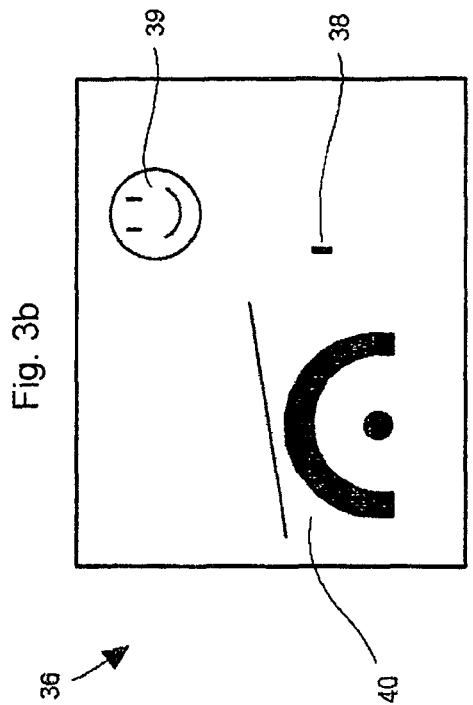
FIGS. 3a and 3b show pictograms for different changes to be expected in accordance with the present invention.

Based on the cartoon face with the negative expression 37 and a high number of lost grains 38 next to a symbol 40 of the cleaning device, the operator intuitively grasps that the adjustment he made will have a negative effect on the working result of the cleaning device. He now has the option of reducing the fan speed directly. When he has found the setting parameter for the speed of cleaning fan 24 that is optimal for the working result of the cleaning device, he is shown another pictogram 36 in display unit 29, e.g., as shown in FIG. 3b. Based on the cartoon face with the positive expression 39 and the low number of lost grains 38 next to a symbol 40 of the cleaning device, the operator intuitively grasps that the setting parameter he selected is optimal.

Figure 3A:
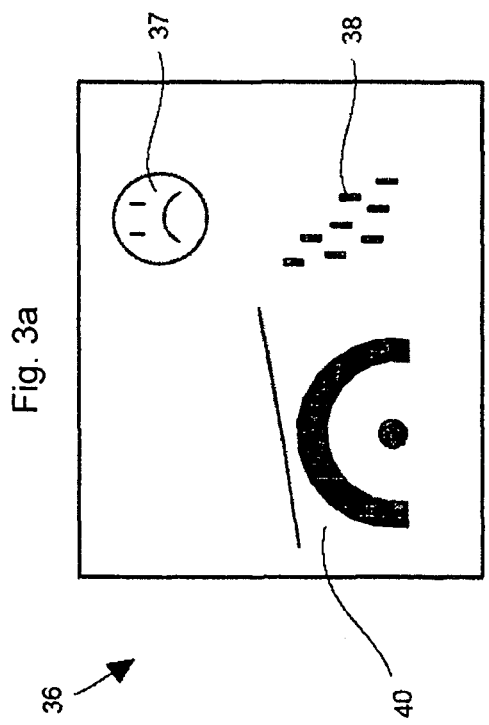

The intuitive grasp of the expected changes may be improved further by displaying pictogram 36 in FIG. 3a in red, and the pictogram in FIG. 3b in green.

It is also feasible within the scope of the present invention to display—in addition to the extreme cases shown in FIGS. 3a and 3b—further pictograms that symbolize the intermediate steps between the two extremes. With further pictograms, for example, the number of lost grains 38 shown could decrease incrementally from FIG. 3a to FIG. 3b, thereby enabling the operator to determine what influence is to be expected based on the change he carried out, even when he makes small changes to the fan speed.

Figure 4A:
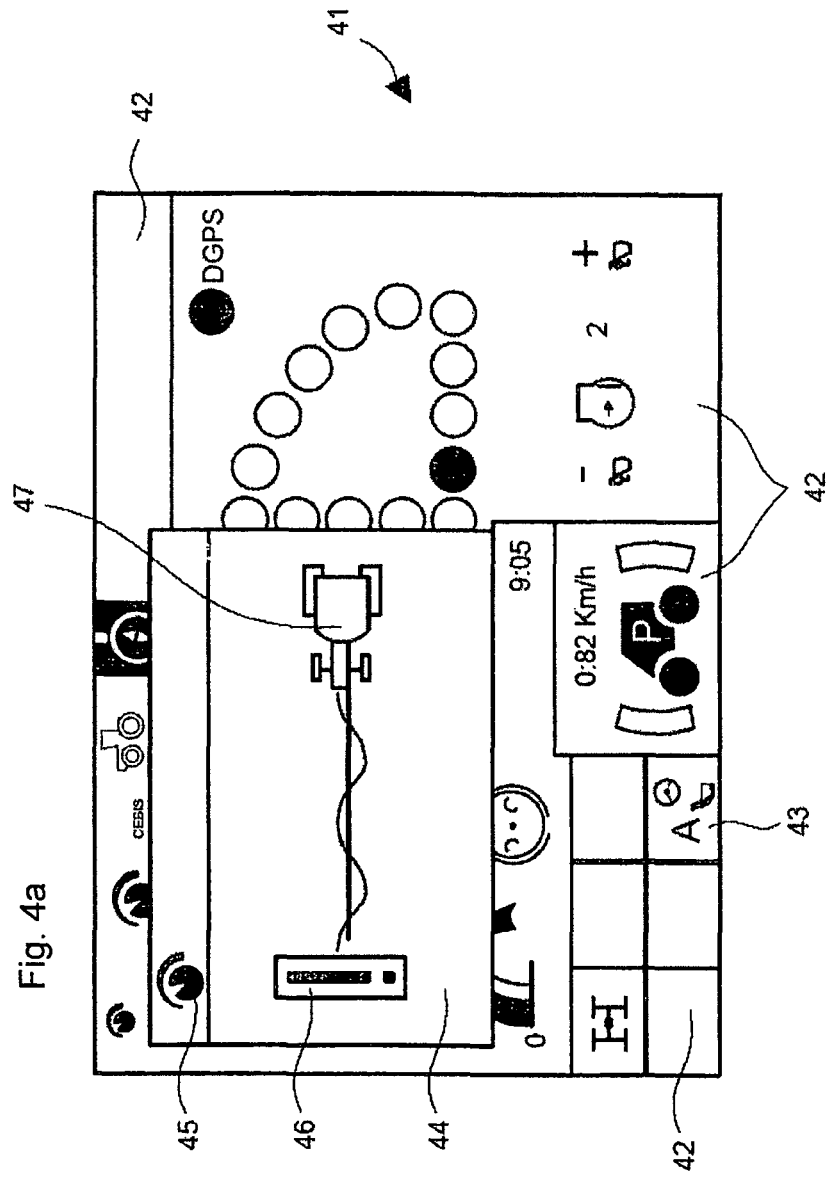
FIGS. 4a and 4b show the display of a display unit in accordance with the present invention.
Figure 4B:
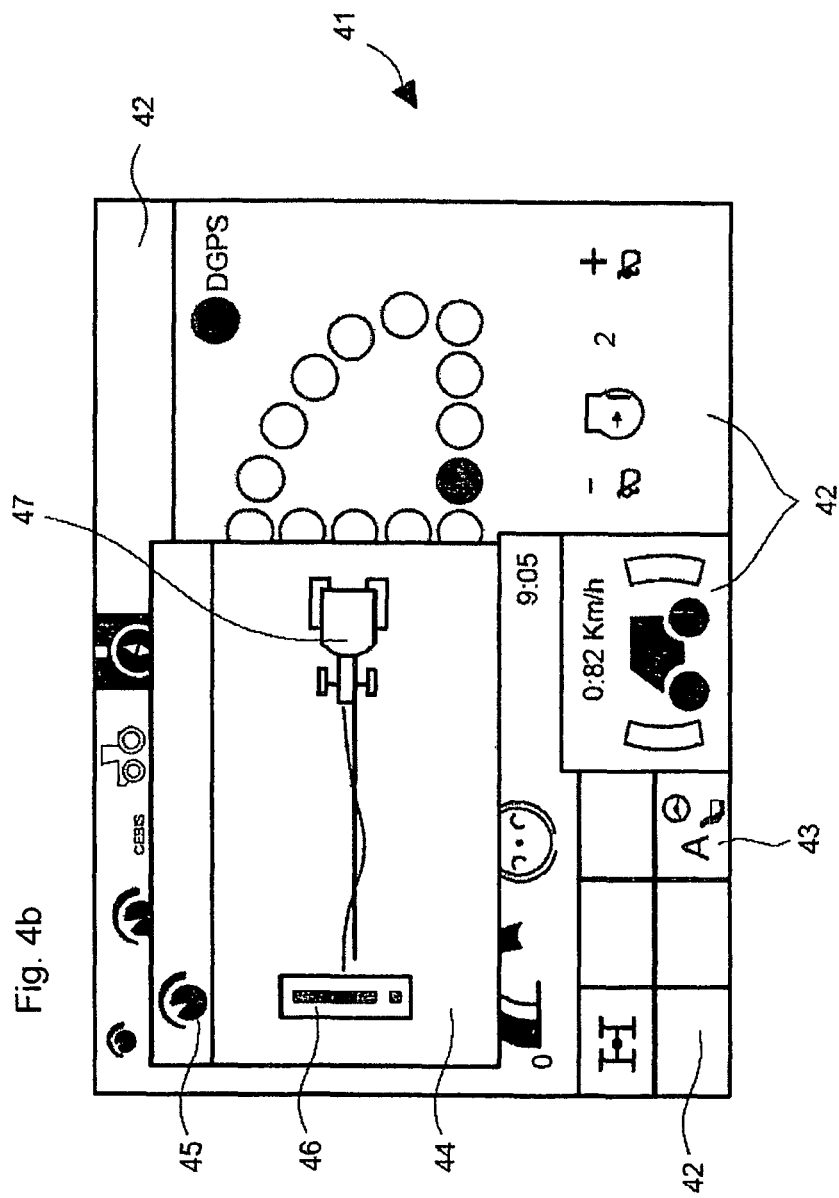

FIGS. 4a and 4b show, as an example, screen display 41 of a display unit of a not-shown agricultural working vehicle designed as a tractor. Screen display 41 is divided into several different areas 42, in which various setting parameters of the working assemblies and/or registered sensor values and/or further settings of the tractor are displayed. In area 43, it is shown, e.g., that the tractor is in an automatic steering mode using a GPS-based tracking system. The operator now has the option of influencing the setting parameter for the aggressiveness of the tracking. If he changes the level of aggressiveness, a pictogram 44 that symbolizes the expected change to the driving behavior of the tractor appears in a certain area in screen display 41.

FIG. 4a shows a pictogram 44 that symbolizes a negative expected change to the driving behavior of the tractor. To ensure that the operator grasps this quickly and intuitively, pictogram 44 contains a symbol 45 for the aggressiveness of the steering setting, a symbol 47 for a tractor and its tracking behavior with high aggressiveness, and an exclamation point 46 in red. The operator therefore grasps directly that the change he made to the setting parameter will have a negative effect, and he will therefore change the setting parameter once more.

FIG. 4b shows a pictogram 44 that symbolizes a positive expected change to the driving behavior of the tractor. To ensure that the operator grasps this quickly and intuitively, pictogram 44 contains a symbol 45 for the aggressiveness of the steering setting, a symbol 45 for a tractor and its tracking behavior with high aggressiveness, and an exclamation point 46 in green. The operator therefore grasps directly that the change he made to the setting parameter will have a positive effect, and he will therefore not make any further adjustments.

It will be understood that each of the elements described above, or two or more together, may also find a useful application in other types of constructions differing from the types described above.

While the invention has been illustrated and described as embodied in an agricultural working vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:
1. An agricultural working vehicle, comprising:
   a plurality of working assemblies;
   at least one control unit for influencing setting parameters of said working assemblies;
   a memory unit; and
   at least one display unit, said display unit is configured so that an expected change in a function and/or a working result of individual working assemblies or a plurality of working assemblies is depicted in said display unit in a manner that depends on how an operator influences individual setting parameters of said working assemblies, wherein said display unit is configured so that the expected change in the function and/or the working result of individual working assemblies or a plurality of working assemblies is depicted in the display unit in the form of a trend of expected effects.

2. An agricultural working vehicle as defined in claim 1, wherein said display unit is configured so that the expected change in the function and/or the working result of individual working assemblies or a plurality of working assemblies is displayed in the display unit in an evaluated manner.

3. An agricultural working vehicle defined in claim 1, wherein said memory unit is configured so that a large number of setting parameters is stored in a recallable manner in the memory unit along with their influence on the function and/or the working result of individual working assemblies or a plurality of working assemblies, which are compared with current setting parameters influenced by an operator, in order to depict an expected change in the function and/or working result in the display unit.

4. An agricultural working vehicle as defined in claim 3, wherein said memory unit is configured so that setting parameters and/or functions and/or working results that deviate from the setting parameters stored in the memory unit with their influence on the function and/or the working result of individual working assemblies or a plurality of working assemblies are stored in the memory unit in a recallable manner.

5. An agricultural working vehicle as defined in claim 1, wherein said control unit and/or said memory unit are configured so that at least one algorithm is stored in the control unit and/or the memory unit that calculates an expected change in the function and/or the working result of individual working assemblies or a plurality of working assemblies in a manner that depends on how an operator has influenced individual setting parameters of the working assemblies, the expected change then being displayed in the display unit.

6. An agricultural working vehicle as defined in claim 1, wherein said display unit is configured so that the expected change in the function and/or the working result of individual working assemblies or a plurality of working assemblies are/is depicted in the display unit in the form of different pictograms.

7. An agricultural working vehicle as defined in claim 6, wherein said display unit is configured so that a shape and/or color and/or size of the pictograms depicted in the display unit differ depending on the expected change in the function and/or the working result of individual working assemblies or a plurality of working assemblies.

8. An agricultural working vehicle as defined in claim 1, wherein said display unit is configured so that an expected change in the function and/or the working result of individual working assemblies or a plurality of working assemblies is depicted in the display unit only for a certain period of time.

9. An agricultural working vehicle as defined in claim 1, wherein said memory unit and said display unit are configured so that a large number of setting parameters is stored in a recallable manner in the memory unit along with their influence on the function and/or the working result of individual working assemblies or a plurality of working assemblies, which are compared with current setting parameters influenced by an operator, in order to depict an expected change in the function and/or working result in the display unit, and wherein, if the change in the function and/or working result is expected to be negative, an operator is also shown setting parameters that are stored in the memory unit that would bring about a positive change in the function and/or working result.

10. An agricultural working vehicle as defined in claim 1, further comprising means for selecting by an operator individual or a plurality of functions and/or working results from a plurality of functions and/or working results of individual working assemblies or a plurality of working assemblies, the expected change to which is depicted in the display unit.

11. An agricultural working vehicle as defined in claim 10, wherein said means for selecting is configured so that when selecting from a plurality of expected changes to be displayed, an operator may evaluate selected changes to be expected in a weighted manner.

12. An agricultural working vehicle, in particular a combine harvester, as recited in claim 1, further comprising means actuatable by an operator and configured so that if an excessive quantity of tailings is detected, the operator reduces a concave width setting, and the control unit compares the setting parameters of the concave width with setting parameters stored in the memory unit and their influence on a working result, and, if the concave width selection is too small, the display unit shows that a quantity of damaged grain in a crop material will tend to increase.

13. The agricultural working vehicle, in particular a combine harvester, as defined in claim 1, further comprising means actuatable by an operator and configured so that if an excessive quantity of damaged grain in a crop material is detected, the operator increases a concave width setting, and the control unit compares setting parameters of the concave width with setting parameters stored in the memory unit and their influence on a working result, and, if the concave width selection is too great, the display unit shows that a quantity of tailings will tend to increase.

14. An agricultural working vehicle, in particular a combine harvester, as defined in claim 1, further comprising means actuatable by an operator and configured so that if it is detected that a contamination of a crop material conveyed into a grain tank is too great, the operator reduces a width setting of an upper sieve and/or the lower sieve, and the control unit compares the setting parameters of a screen opening width with a setting parameters stored in the memory unit and their influence on a working result, and, if the screen opening width is too small, the display unit shows that the losses due to cleaning will tend to increase.

15. An agricultural working vehicle, in particular a combine harvester, as defined in claim 1, further comprising means actuatable by an operator and configured so that if it is detected that losses due to cleaning are too great, the operator reduces the width setting of an upper sieve and/or a lower sieve, and the control unit compares setting parameters of a screen opening width with setting parameters stored in the memory unit and their influence on a working result, and, if the screen opening width is too great, the display unit shows that cleanliness of a crop material conveyed into a grain tank will tend to worsen.

16. An agricultural working vehicle, in particular a combine harvester, as defined in claim 1, further comprising means actuatable by an operator and configured so that if it is detected that a contamination of a crop material conveyed into a grain tank is too great, the operator increases a rotational speed setting of a cleaning fan, and the control unit compares setting parameters of the cleaning fan rotational speed with the setting parameters stored in the memory unit and their influence on a working result, and, if the cleaning fan rotational speed setting is too high, the display unit shows that losses due to cleaning will tend to increase.

17. An agricultural working vehicle, in particular a combine harvester, as defined in claim 1, further comprising means actuatable by an operator and configured so that if it is detected that losses due to cleaning are too great, the operator reduces rotational speed setting of a cleaning fan, and the control unit compares setting parameters of the cleaning fan rotational speed with setting parameters stored in the memory unit and their influence on a working result, and, if the cleaning fan rotational speed setting is too low, the display unit shows that cleanliness of a crop material conveyed into a grain tank will tend to worsen.

* * * * *